(12) United States Patent
Lin (10) Patent No.: US 8,279,634 B2
(45) Date of Patent: *Oct. 2, 2012

(54) CIRCUIT AND METHOD FOR PREDICTING A VALLEY TIMING FOR A VOLTAGE ACROSS A SWITCHING DEVICE

(75) Inventor: Tzu-Chen Lin, Taipei (TW)

(73) Assignee: Richtek Technology Corp., Hsinchu (TW)

( * ) Notice: Subject to any disclaimer, the term of this patent is extended or adjusted under 35 U.S.C. 154(b) by 22 days.

This patent is subject to a terminal disclaimer.

(21) Appl. No.: 12/986,648

(22) Filed: Jan. 7, 2011

(65) Prior Publication Data

US 2011/0095735 A1 Apr. 28, 2011

Related U.S. Application Data

(63) Continuation of application No. 11/984,561, filed on Nov. 20, 2007, now Pat. No. 7,907,425.

(30) Foreign Application Priority Data

Nov. 24, 2006 (TW) ................................ 95143586 A (51) Int. Cl.
*H02M 3/335* (2006.01)

(52) U.S. Cl. .................. 363/21.05; 363/21.13; 323/283; 323/284

(58) Field of Classification Search .............. 363/17–20, 363/21.04, 21.05, 21.07, 21.08, 21.11–21, 363/21.16, 49, 78

See application file for complete search history.

(56) References Cited

U.S. PATENT DOCUMENTS

| 6,445,598 B1 * | 9/2002 | Yamada ..................... 363/21.12 |
| 6,958,920 B2 * | 10/2005 | Mednik et al. .................. 363/19 |
| 2006/0250823 A1 * | 11/2006 | Murata et al. ................... 363/18 |

* cited by examiner

*Primary Examiner* — Nguyen Tran (74) *Attorney, Agent, or Firm* — Rosenberg, Klein & Lee (57) ABSTRACT

Disclosed are circuits and methods for use in a control circuit of a switching mode power supply for turning on a switching device in the switching mode power supply when the voltage across the switching device is at a minimum. A voltage detector is provided for detecting the voltage across the switching device to produce a detection voltage which is a function of the voltage across the switching device, and circuit arrangement is used to predict a valley timing for the voltage across the switching device by evaluating the time period that the detection voltage falls down from a first threshold to a second threshold.

8 Claims, 8 Drawing Sheets

CIRCUIT AND METHOD FOR PREDICTING A VALLEY TIMING FOR A VOLTAGE ACROSS A SWITCHING DEVICE

RELATED APPLICATIONS

This application is a Continuation patent application of co-pending application Ser. No. 11/984,561, filed on 20 Nov. 2007. The entire disclosure of the prior application, Ser. No. 11/984,561, from which an oath or declaration is supplied, is considered a part of the disclosure of the accompanying Continuation application and is hereby incorporated by reference.

FIELD OF THE INVENTION

The present invention is related generally to a switching mode power supply and, more particularly, to a valley predicting circuit and method for a switching mode power supply.

BACKGROUND OF THE INVENTION

Figure 1:
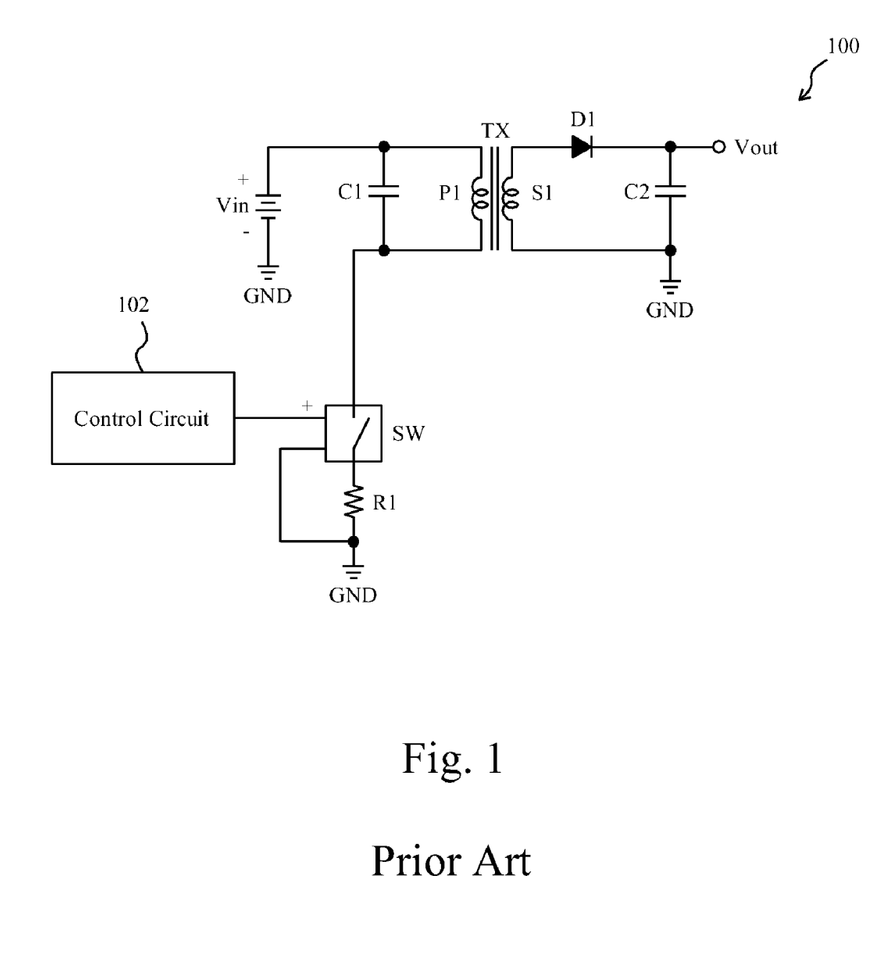
FIG. 1 shows a conventional quasi-resonance flyback power supply.

An important challenge to the development of an advanced switching mode power supply is to increase the switching frequency of the power switch in the power stage of the power supply, because a power supply operating with higher switching frequency may be designed with smaller volume and less weight. However, higher switching frequency results in more switching loss, and it is therefore required to reduce the switching loss for implementing a high switching frequency design. FIG. 1 shows a conventional quasi-resonance flyback power supply 100, in which a power switch SW is connected in series to a power source Vin and a primary winding P1 of a transformer TX, a capacitor C1 is shunt to the primary winding P1, and a control circuit 102 switches the power switch SW to produce a current on a secondary winding S1 of the transformer TX, so as to charge a capacitor C2 to thereby produce an output voltage Vout.

Figure 2:
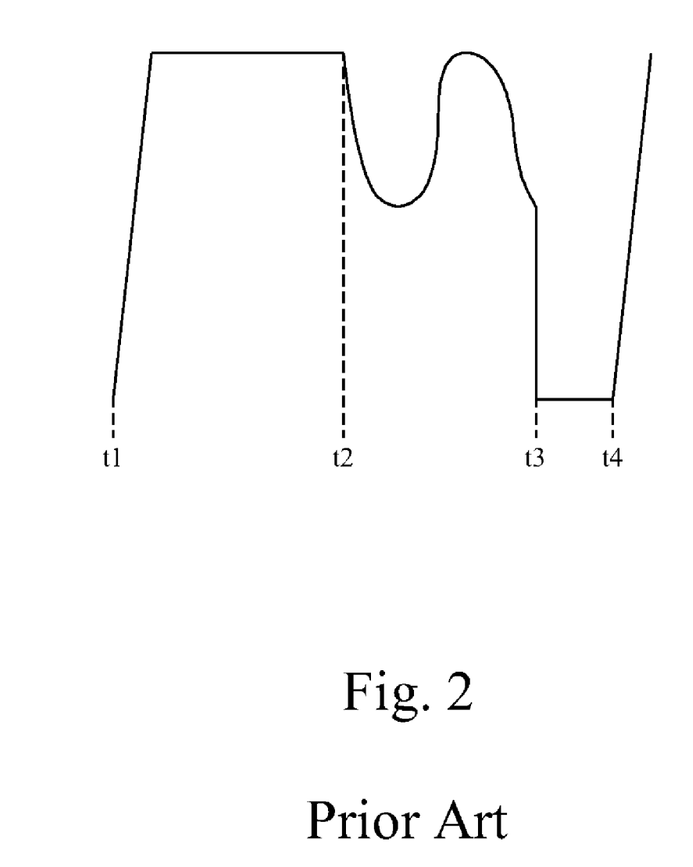
FIG. 2 is a waveform diagram showing the voltage across the power switch in the circuit of FIG. 1.

FIG. 2 is a waveform diagram showing the voltage across the power switch SW of FIG. 1. After the power switch SW is turned off at time t1, a current flows from the secondary winding S1 through a diode D1 to charge the capacitor C2, and the voltage across the power switch SW rises up to a value and remains there until t2. Then the current on the secondary winding S1 becomes off at time t2, but the power switch SW is still off between time t2 and time t3, and the voltage across the power switch SW resonates and thereby has a sinusoidal waveform, due to the oscillation of the magnetizing inductance of the transformer TX and the stray capacitance of the power switch SW and transformer TX. The power switch SW is turned on at time t3, and the voltage across the power switch SW drops off, until the power switch SW is turned off again at time t4. To reduce the switching loss of the power switch SW, the best timing to turn on the power switch SW is when the voltage across the power switch SW is at a minimum, that is, at the valley point of the sinusoidal wave.

Therefore, the key factor of reducing the switching loss is to precisely detect the minimum of the voltage across the power switch SW during the oscillating period. Usually, a differentiator is used to detect the minimum of the voltage across the power switch SW during the oscillating period, for example, proposed by U.S. Pat. No. 6,722,989 to Majid et al. According to the present invention, a valley predicting circuit and method are disclosed for a switching device of a switching mode power supply.

SUMMARY OF THE INVENTION

An object of the present invention is to provide a circuit and method for predicting a valley timing for the voltage across a switching device.

The present invention discloses a circuit and method for use in a control circuit of a switching mode power supply for turning on a switching device in the switching mode power supply when the voltage across the switching device is at a minimum. According to the present invention, a voltage detector detects the voltage across the switching device to produce a detection voltage which is a function of the voltage across the switching device, a first comparator compares the detection voltage with a first threshold to produce a first comparison signal, a second comparator compares the detection voltage with a second threshold to produce a second comparison signal, a logic circuit produces logic signals according to the first and second comparison signals, and a timer predicts the time period that the detection voltage will fall down from the first threshold to the second threshold according to the logic signals, so as to determine the valley timing for the detection voltage.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 3:
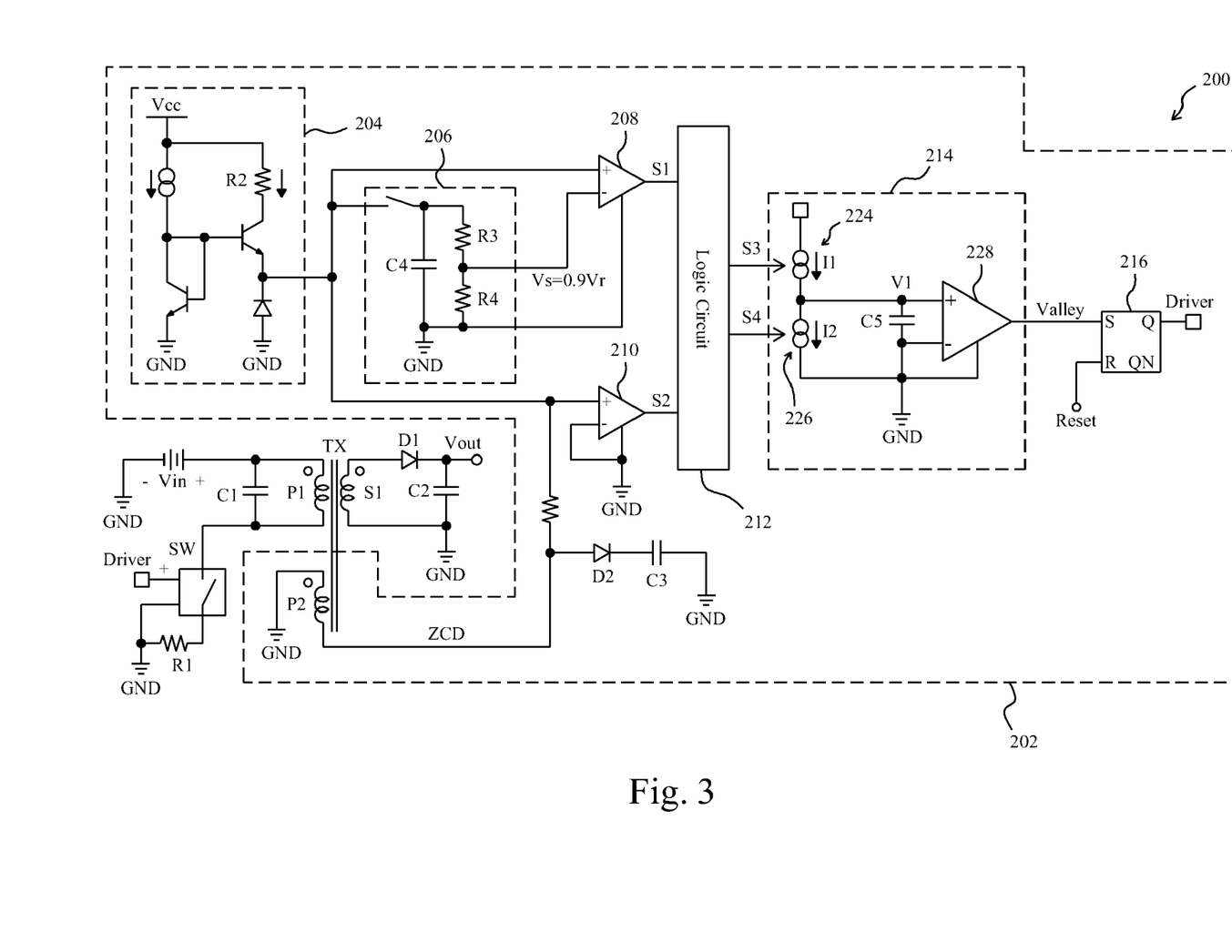
FIG. 3 is a first embodiment according to the present invention.
Figure 4:
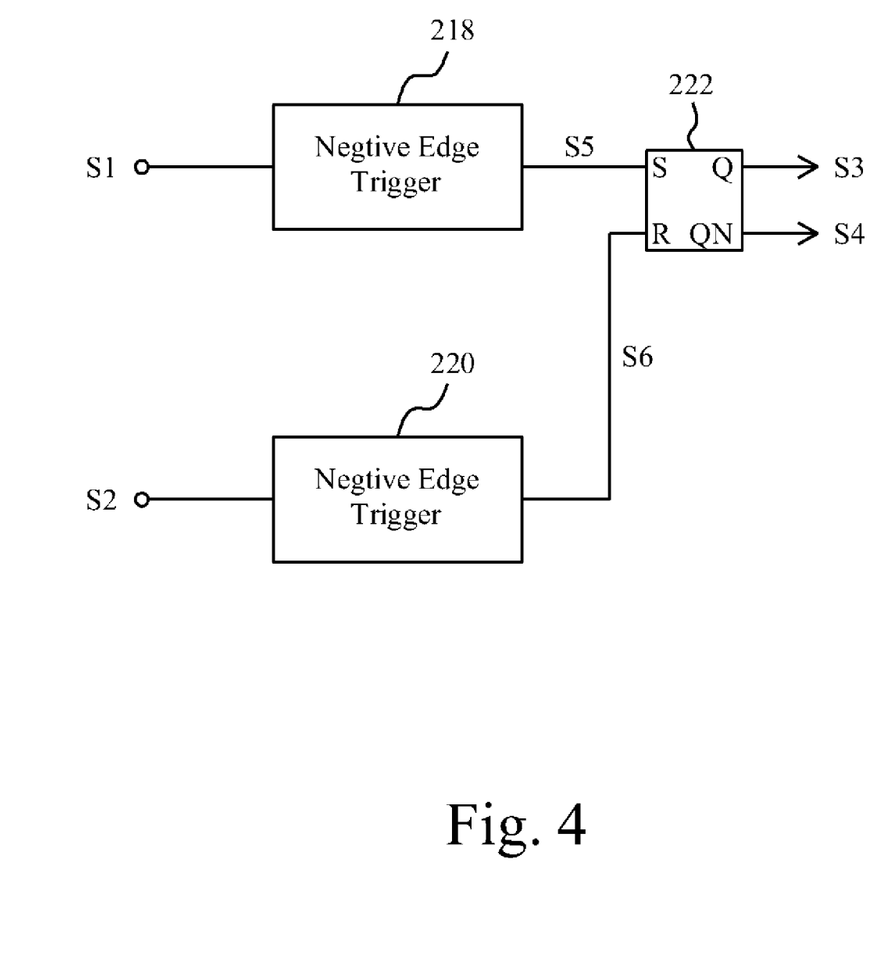
FIG. 4 is an embodiment for the logic circuit shown in FIG. 3.

FIG. 3 shows a first embodiment according to the present invention. In a quasi-resonance flyback power supply 200, a power switch SW is connected in series to a power source Vin and a primary winding P1 of a transformer TX, and a control circuit 202 provides a driving signal Driver to switch the power switch SW, so as to convert an input voltage Vin to an output voltage Vout. The control circuit 202 comprises a voltage detector for detecting the valley of the voltage across the power switch SW, which includes an auxiliary winding P2 to provide information concerning the voltage on the power switch SW, and thereby a detection voltage ZCD is produced, which is a function of the voltage across the power switch SW. The control circuit 202 further comprises a clamping circuit 204 to clamp the detection voltage ZCD above zero, and a sample and hold circuit 206 to sample the detection voltage ZCD to produce a threshold voltage Vs=0.9 Vr (where Vr is a maximum limit). A comparator 208 compares the detection voltage ZCD with the threshold voltage Vs to produce a comparison signal S1, another comparator 210 compares the detection voltage ZCD with a zero threshold voltage to produce a second comparison signal S2, and a logic circuit 212 provides two logic signals S3 and S4 according to the comparison signals S1 and S2. The logic signals S3 and S4 are used to control two current sources 224 and 226 in a timer 214 to determine a charging current I1 and a discharging current I2 in order to charge and discharge a capacitor C5, and a comparator 228 compares the timer voltage V1 on the capacitor C5 with a zero threshold voltage to produce a valley signal Valley. The valley signal Valley is connected to the setting input S of a flip-flop 216 to trigger the driving signal Driver which will turn on the power switch SW when it is triggered. The ring across the power switch SW is resulted from the oscillation of the magnetizing inductance of the transformer TX and the stray capacitance of the power switch SW and transformer TX, so it has a sinusoidal waveform, and the valley happens when the detection voltage ZCD is −Vr. FIG. 4 provides an embodiment for the logic circuit 212, in which two negative-edge triggering circuits 218 and 220 are used to produce two signals S5 and S6 in response to the comparison signals S1 and S2 respectively, as the setting input S and resetting input R of a flip-flop 222, in order to determine the logic signals S3 and S4 which are complementary to each other.

Figure 5:
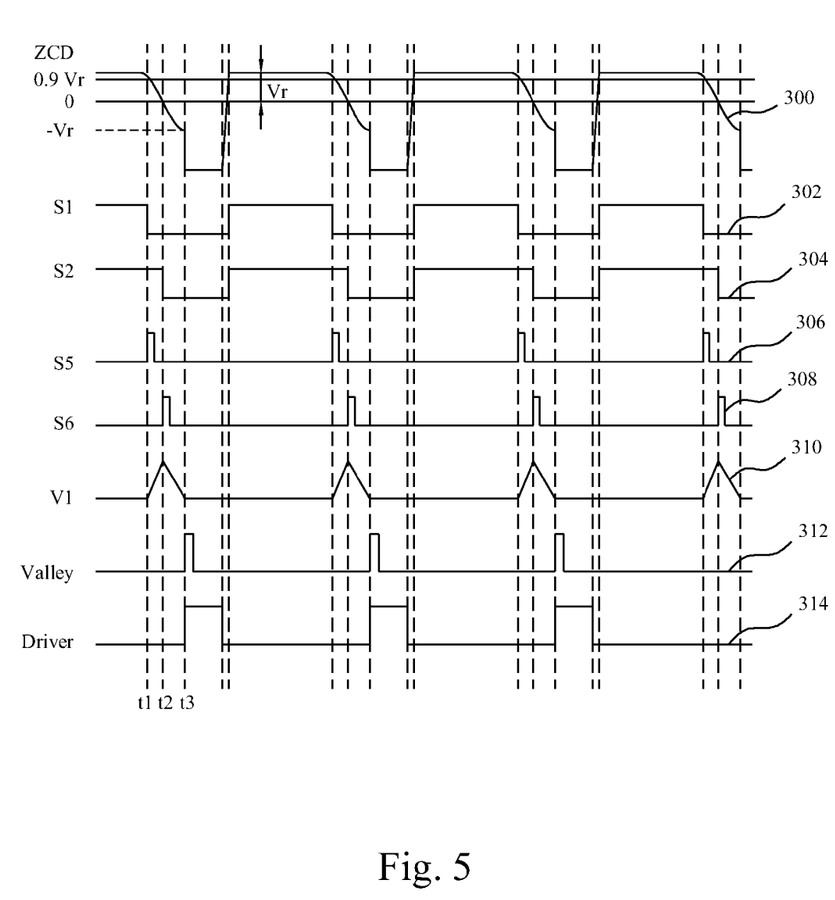
FIG. 5 is a waveform diagram showing the timing of corresponding signals in the circuits of FIGS. 3 and 4.

FIG. 5 is a waveform diagram showing the timing of corresponding signals in the circuits of FIGS. 3 and 4, in which waveform 300 represents the detection voltage ZCD, waveform 302 represents the comparison signal S1, waveform 304 represents the comparison signal S2, waveform 306 represents the signal S5, waveform 308 represents the signal S6, waveform 310 represents the timer voltage V1, waveform 312 represents the valley signal Valley, and waveform 314 represents the driving signal Driver. Because the oscillation of the voltage across the power switch SW results in a sinusoidal waveform, the valley of the detection voltage ZCD will appear regularly, and therefore the valley point of the detection voltage ZCD can be predicted, if the time period of any section of the sinusoidal waveform of the detection voltage ZCD is known. For example, both of the time periods that the detection voltage ZCD falls down from the peak Vr to 0 and from 0 to the valley −Vr are equal to a quarter cycle period of the sinusoidal waveform, and therefore one of them can be used to predict the other one. This embodiment implements the prediction of the valley point of the detection voltage ZCD by evaluating the time period of the detection voltage ZCD falling down from 0.9Vr to 0, in which the evaluating range is selected to avoid possible error operation. As shown in FIG. 5, when the detection voltage ZCD falls down to reach 90% of Vr at time t1, the comparison signal S1 changes from high to low, so the negative-edge triggering circuit 218 triggers the signal S5 to enable the logic signal S3 by triggering the setting input S of the flip-flop 222, which enables the current source 224 to provide the charging current I1 to charge the capacitor C5, thereby increasing the timer voltage V1. Until time t2, the detection voltage ZCD becomes lower than 0, the other comparison signal S2 changes from high to low, so the other negative-edge triggering circuit 220 triggers the signal S6 to reset the flip-flop 222, by which the current source 224 stops providing the charging current I1 and the current source 226 starts to conduct the discharging current I2 so as to discharge the capacitor C5. With a proper ratio of the charging current I1 and the discharging current I2, the capacitor C5 can be completely discharged at time t3 that the valley point of the detection voltage ZCD happens, and the comparator 228 triggers the valley signal Valley to turn on the power switch SW.

As shown by the waveform 310, the timer voltage V1 on the capacitor C5 rises up from 0 first and then falls down to 0, therefore $$C5 \times V1 = (t2-t1) \times I1 = (t3-t2) \times I2. \quad \text{[Eq-1]}$$

Further, the phase variation of each cycle of a sinusoidal wave is $2\pi$, and therefore the phase difference of a sinusoidal wave between time t2 and time t3 is $\pi/2$, thereby $$(t2-t1):(t3-t2) = X:\pi/2, \quad \text{[Eq-2]}$$

where X is the phase difference of the sinusoidal waveform between time t1 and time t2. Because the sinusoidal waveform of the detection voltage ZCD begins from its peak Vr, it can be regarded as a cosine waveform, and therefore $$0.9Vr = \cos\theta \times Vr, \quad \text{[Eq-3]}$$

where cos is the cosine function, and $\theta$ is the phase of the detection voltage ZCD at time t1. The phase $\theta$ is then obtained by inverse transformation $$\theta = \cos^{-1}(0.9). \quad \text{[Eq-4]}$$

On the other hand, the time period that the sinusoidal waveform falls down from its peak Vr to 0 is also a quarter cycle of the sinusoidal waveform, so the phase difference of the sinusoidal waveform between time t1 and time t2 is $$X = (\pi/2) - \cos^{-1}(0.9). \quad \text{[Eq-5]}$$

By substituting the equations Eq-2 and Eq-5 into the equation Eq-1, it is obtained $$(\pi/2) \times I2 = [(\pi/2) - \cos^{-1}(0.9)] \times I1. \quad \text{[Eq-6]}$$

Therefore, the relationship between the charging current I1 and the discharging I2 is derived as $$I2 = [1 - (2/\pi) \times \cos^{-1}(0.9)] \times I1 = 0.713 \times I1. \quad \text{[Eq-7]}$$

According to the present invention, the clamping circuit 204 is simpler because it does not have to produce a clamping current to detect the valley of the voltage across the power switch SW. Moreover, in other embodiments, the charging current I2 may be selected to be slightly greater than the calculated one, such that the valley signal Valley will be triggered earlier than the valley point of the voltage across the power switch SW, in order to avoid possible signal propagation delay.

Figure 6:
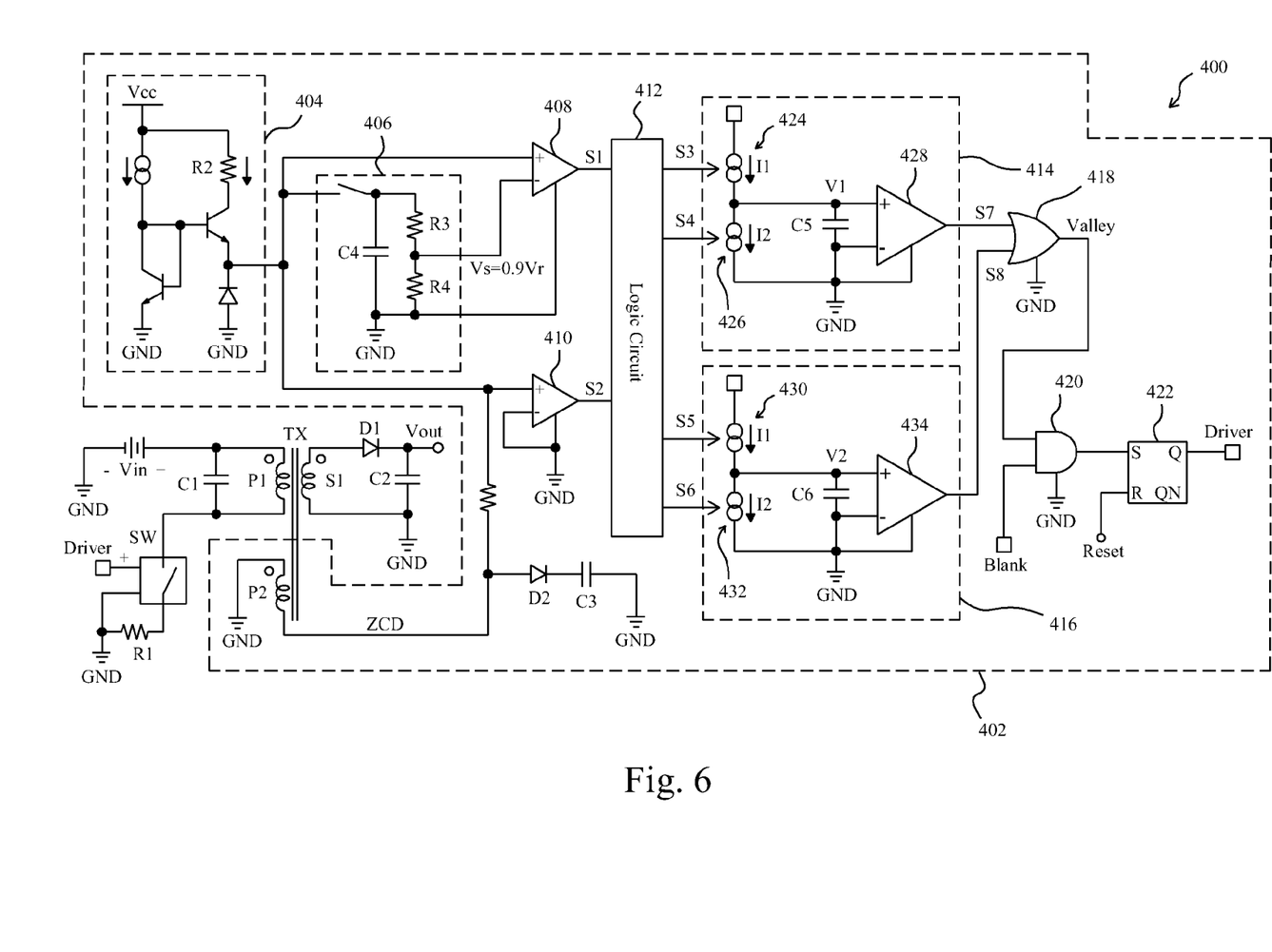
FIG. 6 is a second embodiment according to the present invention.
Figure 7:
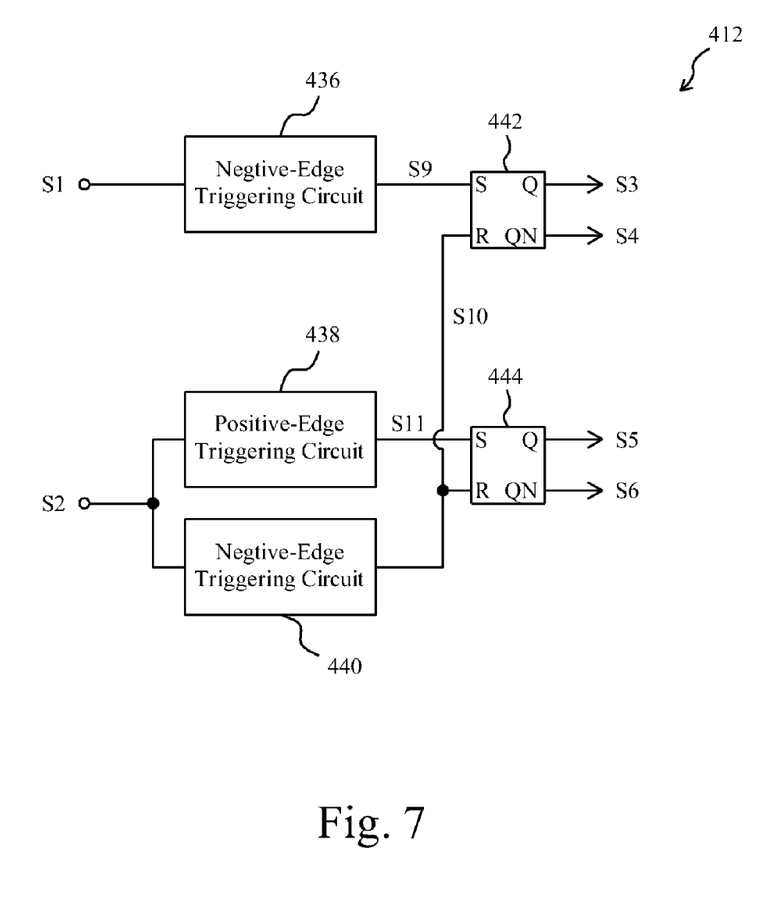
FIG. 7 is an embodiment for the logic circuit shown in FIG. 6.

More timers may be used in some embodiments, and FIG. 6 provides one for illustration of valley selection according to the present invention. In a quasi-resonance flyback power supply 400, a power switch SW is connected in series to a power source Vin and a primary winding P1 of a transformer TX, and a control circuit 402 provides a driving signal Driver to switch the power switch SW, so as to convert an input voltage Vin to an output voltage Vout. In the control circuit 402, to detect the valley of the voltage across the power switch SW, a voltage detector has an auxiliary winding P2 to provide information concerning the voltage on the power switch SW and thereby to produce a detection voltage ZCD which is a function of the voltage across the power switch SW, a clamping circuit 404 clamps the detection voltage ZCD above zero, a sample and hold circuit 406 samples the detection voltage ZCD to produce a threshold voltage Vs=0.9 Vr, a comparator 408 compares the detection voltage ZCD with the threshold voltage Vs to produce a first comparison signal S1, another comparator 410 compares the detection voltage ZCD with a zero threshold voltage to produce a second comparison signal S2, a logic circuit 412 produces two pairs of logic signals S3, S4, and S5, S6 according to the comparison signals S1 and S2, a timer 414 has two current sources 424 and 426 controlled by the logic signals S3 and S4 to determine a charging current I1 and a discharging current I2 in order to charge and discharge a capacitor C5, and a comparator 428 for comparing the timer voltage V1 on the capacitor C5 with a zero threshold voltage to produce a first valley signal S7, another timer 416 also has two current sources 430 and 432 for providing a charging current I3 and a discharging current I4 according to the logic signals S5 and S6 in order to charge and discharge a capacitor C6, and a comparator 434 for comparing the timer voltage V2 on the capacitor C6 with a zero threshold voltage to produce a second valley signal S8, an OR gate 418 enables a final valley signal Valley depending on whether any one of the valley signals S7 and S8 is active, and an AND gate 420 functions as a blanking circuit to determine which valley point is selected to trigger a flip-flop 422 to enable the driving signal Driver according to a blanking signal Blank produced from the interior of the control circuit 402. FIG. 7 provides an embodiment for the logic circuit 412, in which two negative-edge triggering circuits 436 and 440 are triggered by the comparison signals S1 and S2 to enable two signals S9 and S10 respectively, a positive-edge triggering circuit 438 is triggered by the comparison signal S2 to trigger a signal S11, the signals S9 and S11 are provided for the setting and resetting inputs of a flip-flop 442 to determine the complementary logic signals S3 and S4, and the signals S11 and S10 are provided for the setting and resetting inputs of another flip-flop 444 to determine the complementary logic signals S5 and S6.

Figure 8:
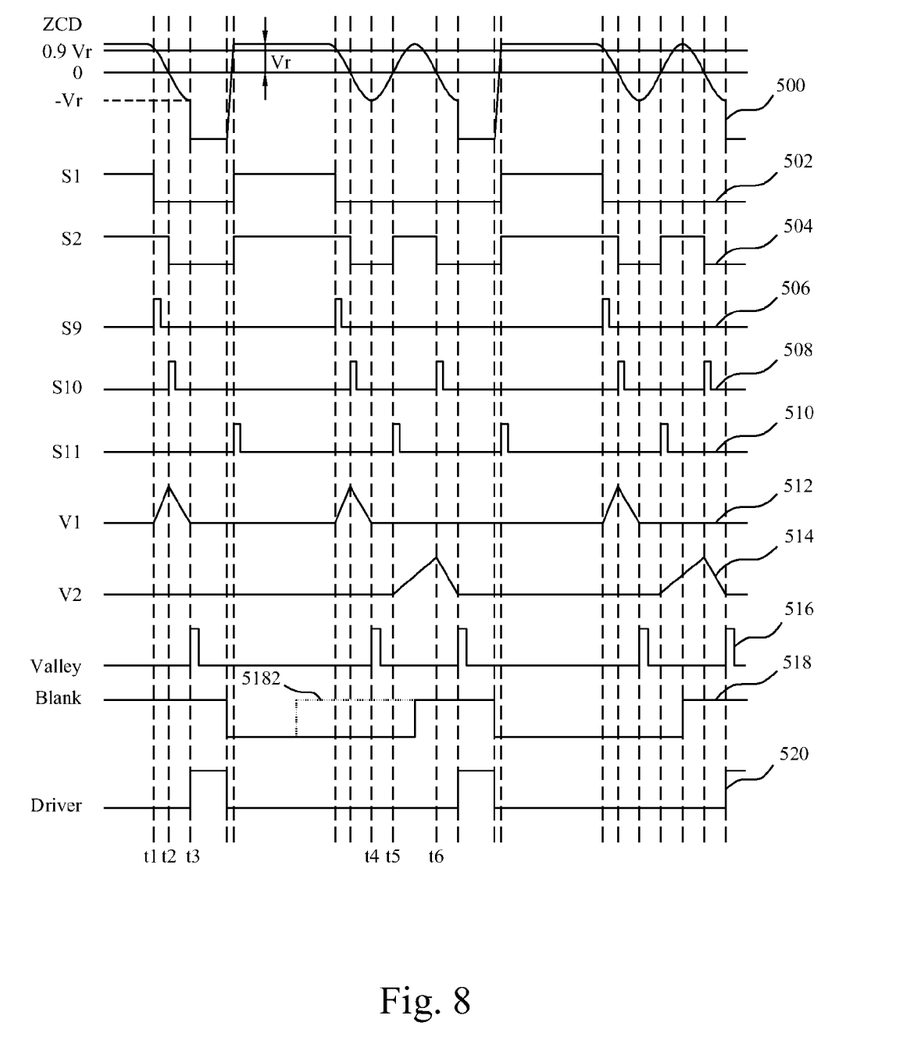
FIG. 8 is a waveform diagram showing the timing of corresponding signals in the circuits of FIGS. 6 and 7.

Since the oscillation of the voltage across the power switch SW results in a sinusoidal waveform, the valley point of the detection voltage ZCD happens when the detection voltage ZCD becomes −Vr. FIG. 8 is a waveform diagram showing the timing of corresponding signals in the circuits of FIGS. 6 and 7, in which waveform 500 represents the detection voltage ZCD, waveform 502 represents the comparison signal S1, waveform 504 represents the comparison signal S2, waveform 506 represents the signal S9, waveform 508 represents the signal S10, waveform 510 represents the signal S11, waveform 512 represents the first timer voltage V1, waveform 514 represents the second timer voltage V2, waveform 516 represents the valley signal Valley, waveform 518 represents the blanking signal Blank, and waveform 520 represents the driving signal Driver. When the detection voltage ZCD falls down to reach the threshold voltage 0.9Vr at time t1, the comparison signal S1 changes to low, thereby triggering the flip-flop 442 to enable the current source 424 starting to charge the capacitor C5, and when the detection voltage ZCD further falls down to reach zero point at time t2, another comparison signal S2 also changes to low, thereby resetting the flip-flop 442 so as to stop the current source 424 to provide the charging current I1 and to enable the current source 426 in order to discharge the capacitor C5. With a proper ratio of the charging current I1 and the discharging current I2 as indicated by the equation Eq-7, the valley point of the detection voltage ZCD can be predicted. When the first timer voltage V1 on the capacitor C4 decreases down to zero at time t3, the comparator 428 enables the valley signal S7, thereby triggering the valley signal Valley by the OR gate 418, and assuming that the blanking signal Blank is high at this time, the flip-flop 422 is triggered to enable the driving signal Driver to turn on the power switch SW.

Alternatively, if the blanking signal Blank is low when the valley signal S7 from the timer 414 is active, for example at time t4 shown in FIG. 8, the valley signal S7 will be blanked and so cannot trigger the flip-flop 422, so that the sinusoidal waveform of the voltage across the power switch SW will remain. When the detection voltage ZCD rises up from the valley point to zero point at time t5, the comparison signal S2 changes from low to high, thereby triggering the flip-flop 444 to enable the current source 430 in the second timer 416 starting to charge the capacitor C6. When the detection voltage ZCD becomes lower than zero again at time t6, the comparison signal S2 changes to low, thereby resetting the flip-flop 444 so as to stop the current source 430 to provide the charging current I3 and to enable the current source 430 in order to discharge the capacitor C6. Similarly, with a proper charging current I4, the valley point of the detection voltage ZCD can be predicted. In this embodiment, the charging time of the capacitor C6 in the second timer 416 is selected to be a half cycle of the sinusoidal waveform, and the discharging time is selected to be a quarter cycle of the sinusoidal waveform, so the discharging current I4 is double of the charging current I3.

In some embodiments, the blanking signal Blank can be used to determine which valley is selected to trigger the flip-flop 422 to turn on the power switch SW. For example, as shown in FIG. 8, if the blanking signal Blank has a waveform including a portion as the dotted line 5182, the power switch SW will be turned on at the first valley point of the sinusoidal waveform at time t4.

While the present invention has been described in conjunction with preferred embodiments thereof, it is evident that many alternatives, modifications and variations will be apparent to those skilled in the art. For example, other devices, which don't affect the function of the circuit, such as a delay circuit, can be used in the circuit. Accordingly, it is intended to embrace all such alternatives, modifications and variations that fall within the spirit and scope thereof as set forth in the appended claims.

What is claimed is:

1. A circuit for predicting a valley timing for a voltage across a switching device, comprising:
    a voltage detector for detecting the voltage across the switching device to produce a detection voltage as a function of the voltage detected across the switching device;
    a first comparator for comparing the detection voltage with a first threshold to produce a first comparison signal;
    a second comparator for comparing the detection voltage with a second threshold to produce a second comparison signal;
    a logic circuit for producing a first logic signal and a second logic signal according to the first and second comparison signals; and,
    a timer for predicting the timing of a valley for the detection voltage according to the first and second logic signals, the timer thereby determining a valley signal corresponding to the detection voltage valley used to trigger turn on of the switching device, the valley signal being thereby generated responsive to the timing of detection voltage change between the first and second thresholds, said timer including a capacitor for providing a timer voltage, a first current source controlled by the first logic signal for determining a first current to charge the capacitor, a second current source controlled by the second logic signal for determining a second current to discharge the capacitor and a third comparator for comparing the timer voltage with a third threshold to produce the valley signal.

2. The circuit of claim 1, wherein the logic circuit comprises:
    a first negative-edge triggering circuit for triggering a setting signal in response to the first comparison signal;

a second negative-edge triggering circuit for triggering a resetting signal in response to the second comparison signal; and a flip-flop for determining the first and second logic signals according to the setting and resetting signals.

3. The circuit of claim 1, further comprising a blanking signal for selectively blanking the valley signal.

4. The circuit of claim 3, wherein the logic circuit further provides a third logic signal and a fourth logic signal according to the first and second comparison signals.

5. The circuit of claim 1, further comprising a sample and hold circuit for sampling the detection voltage to produce the first threshold.

6. A method for predicting valley timing for a switching device, comprising the steps of:

(a) detecting the voltage across the switching device for producing a detection voltage as a function of the voltage detected across the switching device; and, (b) predicting the timing of a valley for the detection voltage by evaluating a first time period wherein the detection voltage goes from a first threshold to a second threshold, to generate a valley signal corresponding to the detection voltage valley used to trigger turn on of the switching device, the valley signal being thereby generated responsive to the timing of detection voltage change between the first and second thresholds where the step of predicting the timing of a valley further includes establishing a capacitor for providing a timer voltage, controlling a first current source by a first logic signal for determining a first current to charge a capacitor, controlling a second current source by a second logic signal for determining a second current to discharge the capacitor, and providing a comparator for comparing the timer voltage with a third threshold to produce the valley signal.

7. The method of claim 6, wherein the step (b) comprises the steps of:

determining the first current and the second current according to the first time period and a second time period that the detection voltage goes from the second threshold to a valley;

charging a capacitor by the first current when the detection voltage is lower than the first threshold; and stopping charging the capacitor by the first current and discharging the capacitor by the second current when the detection voltage is lower than the second threshold, and triggering the valley signal when the capacitor is discharged completely.

8. The method of claim 7, further comprising the step of selectively blanking the valley signal.

* * * * *